Patented July 5, 1927.

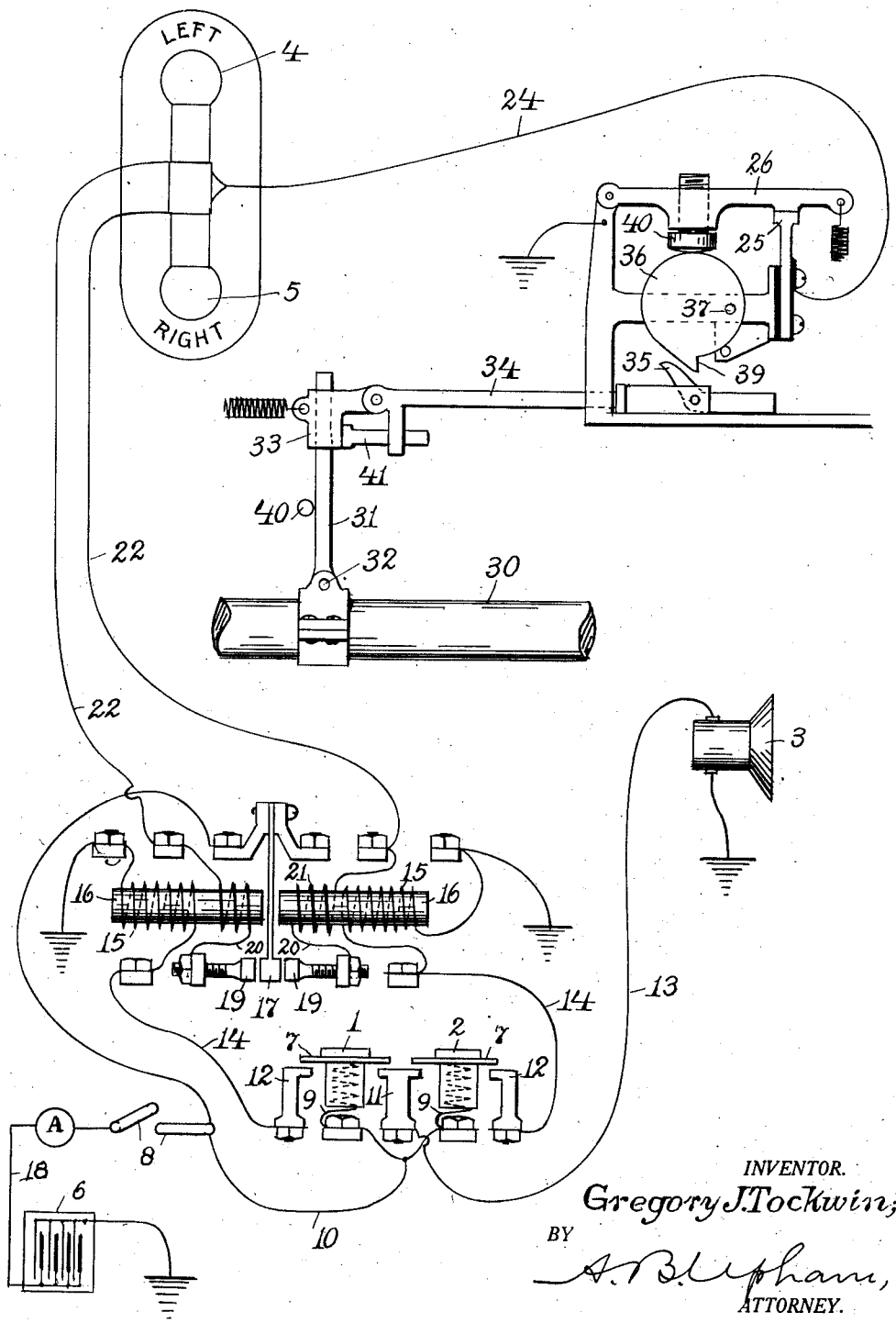

1,634,347

UNITED STATES PATENT OFFICE.

GREGORY J. TOCKWIN, OF BOSTON, MASSACHUSETTS.

SIGNAL SWITCH.

Application filed April 20, 1925. Serial No. 24,507.

This invention relates to signals especially designed for trucks, automobiles and the like, and it has for its object the effecting of means whereby the signals shall remain visible after the chauffeur has removed his finger from the button controlling the same, and until after the truck or automobile has rounded a curve and straightened out his course again.

In the accomplishment of this purpose, I provide the steering mechanism with a circuit breaking device which is brought into action by the divergence of the steering wheels and their return to a straight-ahead course.

The drawings forming part of this specification illustrate in diagram a signal device embodying my invention.

The numerals 1, 2 designate the two push buttons controlling the actuating current to the horn 3 and the signal lights 4, 5, current being taken from the battery 6 with which trucks and automobiles are usually supplied and grounded on the machinery framework in the customary manner.

Each push button has a shoulder 7 in circuit with the current through a spring 9, wire 10, switch 8, ammeter A, and wire 18; and when pushed inward its shoulder is put in circuit with the contacts 11 and 12. This communicates operative current through a lead wire 13 to the horn 3, and simultaneously delivers current through a wire 14 to a coil 15 on the core 16, thereby energizing the latter and causing it to attract the spring-contact 17. If the right hand button 2 is the one pushed, the contact 17 is drawn into touch with the contact 19 and thereby delivers current received through the wire 20 to the coil 21 and thence through the lead wire 22 to the signal light 5 which is preferably colored green; and which current passes on through a common lead wire 24 to a contact 25 upon which a contact finger 26 is resting, and thence to the ground. The core 16 being thus continued in its energized condition, continues to hold the spring contact 17 against the contact 19, and thereby renders the illumination of the light 5 continuous.

If the left hand button is pressed, exactly a like operation is performed, with the only exception that the light 4 is rendered luminous.

To discontinue the illumination automatically, I provide means controlled by the steering mechanism for raising the finger 26 away from the contact 25, and thereby to break the circuit. The circuit being thus broken, the core 16 is demagnetized, the spring contact 17 returns to neutral, and the light is extinguished.

For thus breaking the circuit, I prefer to connect with the tie rod 30 of the steering gear, a slender arm 31 pivoted thereto at 32. The outer end of this arm is slidable in a collar 33 to which is pivoted a rod 34 whose farther end carries a counter-weighted pawl 35. Immediately above the normal position of the pawl is a disk 36 eccentrically pivoted at 37 and provided with a spur tooth 39; and above this disk 36 is an adjustable button 40 carried by the finger 26. Hence, when the rod 34 slides forward under the action of the tie rod 30, the pawl 36 freely passes the spur tooth 39; but when the rod 34 returns to normal, the pawl engages the spur tooth and gives the disk 36 a partial turn, thereby elevating the contact finger 26 out of touch with the contact 25 and breaking the circuit as above described.

The reason why the right-hand movement of the tie rod 30 correspondingly moves the rod 34 is that the contact of the collar 33 with the end of the part 41 prevents the collar from a pivotal action relative to the rod 34, and thereby causes the parts, 30, 31 and 34 to move toward the right as a single inflexible body. Likewise, when the tie rod 30 is moved toward the left, the contact of the part 31 with the stop 40, swings the upper end of the part 31 toward the left, and, since the part 41 does not now interfere therewith, the collar 33 flexes with respect to the part 34 and pushes the latter toward the right. The spring tensioned toward the left upon the collar 33 cannot prevent the right-hand movement of the part 34 in either case, but simply acts to bring the latter back to normal when the tie rod also returns.

Inasmuch as the tie rod 30 is subject to two opposite movements away from normal, one for the right-hand turn of the truck, and the other for the left-hand turn, it is necessary to adapt the rod 34 to the same. To this end, the arm 31 cooperates with a fixed stop 40 near its midlength, whereby the arm fulcrums thereon when the tie rod 30 moves toward the left (as viewed in the drawing) and consequently slides the rod 34 toward the right. Likewise, by providing the rod 34 with a post 41 abutting against the collar 33, the arm is kept from pivotal action when the tie rod 30 moves toward the right, and hence the rod 34 is also moved therewith.

Hence, no matter whether the truck or automobile is steered toward the right or toward the left, the pawl 35 is moved to a point from which its return to normal will act upon the cam 36 and break the circuit.

In use, the chauffer, if he is to turn toward the right, presses the right-hand button 2 an instant, and then returns his hand to the steering wheel; simultaneously the horn sounds and the light 5 is illuminated, and the latter so remains. After the curve has been rounded, and the steering gear returns to its normal straight away course, the pawl 35 engages the tooth 39 and extinguishes the signal light. If the turn is toward the left, the button 1 is pressed and the light 4 is rendered luminous until such time as a straight-away course is again reached.

What I claim as my invention is:

A signal terminating device for automobiles and the like, comprising a stationary contact member, a movable contact member, an arm pivotally carried by the tie rod of the steering mechanism of the automobile, a stationary stop located at substantially the midlength of said arm, a spring urging the free end of said arm toward said stop, a rod pivotally and slidably supported at the free end of said arm, means near the pivot of the rod for preventing flexure thereat in one direction, and means controlled by said rod for removing the movable contact away from the stationary one, said parts being so disposed that the movement toward normal in each direction of said tie rod will shift said pivoted rod similarly and thereby break the circuit.

In testimony that I claim the foregoing invention, I have hereunto set my hand this 17th day of April, 1925.

GREGORY J. TOCKWIN.